(12) United States Patent
Riehmann

(10) Patent No.: US 7,311,067 B2
(45) Date of Patent: Dec. 25, 2007

(54) IMPLEMENT

(75) Inventor: Jens Riehmann, Stuttgart (DE)

(73) Assignee: Andreas Stihl AG & Co. KG (DE)

( * ) Notice: Subject to any disclaimer, the term of this patent is extended or adjusted under 35 U.S.C. 154(b) by 196 days.

(21) Appl. No.: 11/166,697

(22) Filed: Jun. 24, 2005

(65) Prior Publication Data

US 2005/0284422 A1    Dec. 29, 2005

(30) Foreign Application Priority Data

Jun. 25, 2004   (DE)   ............. 10 2004 031 042

(51) Int. Cl.
  *F01P 1/02*   (2006.01)
  *F02B 77/04*   (2006.01)
(52) U.S. Cl. ................ 123/41.7; 123/198 E
(58) Field of Classification Search ............. 123/47.1, 123/198 E, 41.56; D23/370, 411
See application file for complete search history.

(56) References Cited

U.S. PATENT DOCUMENTS

| | | | | |
|---|---|---|---|---|
| 3,867,058 A | * | 2/1975 | Hendrickson | 415/125 |
| 4,370,855 A | * | 2/1983 | Tuggle | 60/317 |
| 4,703,825 A | * | 11/1987 | Mikami et al. | 180/229 |
| 4,841,920 A | * | 6/1989 | Andreasson et al. | 123/41.66 |
| 4,970,993 A | * | 11/1990 | Weiss et al. | 123/41.7 |
| 5,168,837 A | * | 12/1992 | Scholz | 123/41.7 |
| 5,199,389 A | * | 4/1993 | Wolf et al. | 123/41.7 |
| 5,377,632 A | * | 1/1995 | Aronsson et al. | 123/198 E |
| 6,232,672 B1 | * | 5/2001 | Leufen et al. | 290/1 A |
| 6,295,953 B1 | * | 10/2001 | Ohsawa et al. | 123/41.7 |
| 6,640,443 B2 | * | 11/2003 | Husges et al. | 30/276 |
| D484,586 S | * | 12/2003 | Intravatola | D23/370 |
| D534,267 S | * | 12/2006 | Andersen et al. | D23/370 |
| D534,272 S | * | 12/2006 | Frampton et al. | D23/411 |
| 2004/0149241 A1 | * | 8/2004 | Shomura et al. | 123/41.7 |
| 2006/0137626 A1 | * | 6/2006 | Lee | 123/41.49 |
| 2006/0225288 A1 | * | 10/2006 | Herzog et al. | 30/276 |
| 2006/0237439 A1 | * | 10/2006 | Norwood et al. | 219/506 |

FOREIGN PATENT DOCUMENTS

JP       11300657      4/1998

* cited by examiner

*Primary Examiner*—Stephen K. Cronin
*Assistant Examiner*—Hyder Ali
(74) *Attorney, Agent, or Firm*—Robert W. Becker; Robert W. Becker & Associates

(57) ABSTRACT

A manually operated implement comprising a housing for accommodating a drive motor that drives a tool. A fan wheel is disposed in the housing and is driven by the drive motor. A fan wheel cover covers the fan wheel toward the outer side of the housing. Ribs are disposed on the outer surface of the fan wheel cover and span an intake opening of the fan wheel cover in the vicinity of the fan wheel. Beyond the intake opening, the ribs form channels, and upper faces of the ribs that face away from the outer surface of the fan wheel cover form an intake face that in a second area of the ribs is disposed transverse to the outer surface of the fan wheel cover.

21 Claims, 4 Drawing Sheets

IMPLEMENT

BACKGROUND OF THE INVENTION

The invention relates to a manually operated implement, in particular, a cut-off machine or similar device.

A power saw with a fan wheel cover in which air is taken in through a grill is known from U.S. Pat. No. 5,168,837. In order to allow the emergency intake of air if the grill is covered, channels are provided beneath the grill which extends as far as a rear wall of the fan wheel cover. Since the channels run between the grill and an air guide wall, the manufacture of the fan wheel cover using an injection molding process requires costly sliders.

SUMMARY OF THE INVENTION

The object of the invention is to create a manually operated tool with a fan wheel cover which is simple to manufacture and which guarantees an adequate supply of cooling air.

This object is achieved by means of a manually operated implement comprising a housing for accommodating a drive motor that drives a tool; a fan wheel disposed in the housing and driven by the drive motor; a fan wheel cover for covering the fan wheel toward an outer side of the housing, wherein in the vicinity of the fan wheel the fan wheel cover is provided with an intake opening; and ribs disposed on the outer surface of the fan wheel cover and spanning the intake opening, wherein beyond the intake opening the ribs form channels, and wherein upper faces of the ribs that face away from the outer surface of the fan wheel cover form an intake face that in a second area of the ribs is disposed transverse to the outer surface of the fan wheel cover.

Designing a fan wheel cover in such a manner that it contains only ribs which form channels running in the plane of the fan wheel cover means that it is no longer necessary to provide an additional channel structure for the supply of air should the fan wheel cover inadvertently be covered. Indeed, the very channels formed between the ribs can be used to supply the cooling air. For example, if the fan wheel cover is covered by clothing worn by the operator air can still be taken in through the second area of the intake surface positioned transverse to the surface of the fan wheel cover since in this arrangement, due to the orientation of the intake surface, this second area is not covered. Thus air can be taken into the channels via the intake surface in the second area.

The intake surface in the second area advantageously faces the front face of the housing. This orientation means that the intake surface in the second area faces away from the body of the operator, thereby preventing the aspiration of clothing or similar items. Advantageously positioned adjacent to the second area of the intake surface is a third area, an edge being formed between the third area and the second area. The edge, too, prevents clothing or similar items aspirated in the third area from resting against the second area. In addition, the formation of an edge between the two areas prevents fabrics, leather or other materials from coming into contact with the edge. The upper face of a rib in the second area advantageously lies at an angle of 15° to 90°, in particular 25° to 75°, to the upper face in the third area. This arrangement means, in particular, that the angle decreases from a central rib to outer ribs. As a result, the shape of the intake surface is curved around the periphery of the housing and the presence of an edge does not therefore impair the handling of the tool. The height of the ribs advantageously decreases continuously in a third area adjacent to the second area. In this arrangement, the third area is in particular an area of the ribs facing the rear face of the housing. Due to the flat design of the ribs and the continuous increase in rib height in the third area, the ribs form an approximately flat surface. The operator is able to hold this surface of the tool against his body during operation in such a manner as to ensure good handling. At the same time, the presence of the second area ensures an adequate supply of both cooling and combustion air to the drive motor. The tool advantageously has a gripper bar or tubular handle which spans the housing in the vicinity of the front face of the housing, and a rear handle which is fixed to the rear face of the housing. In implements with a rear handle, in particular, the operator is likely to rest the area of the implement near the fan wheel cover against his body since the rear face of such an implement does not offer a sufficiently large surface on which to rest it. Due to the flat design of the ribs in the first area and the positioning of the second area adjacent to the first area, it is possible to guarantee good access to the tubular handle. The ribs between the first and second areas are positioned sufficiently far from the handle. At the same time, the positioning of the handle shields the second area to a certain extent, and it is therefore unlikely that clothing will be aspirated in the second area.

In order to guarantee adequate air intake, an opening positioned in the fan wheel cover and connected to the intake opening by at least one channel runs into said channel. If the fan wheel cover is inadvertently covered, air from inside the housing is delivered through the opening into a channel formed between two ribs and from there back into the housing through the intake opening. The air taken in from the housing is taken in from the area of the carburetor chamber and/or through the vibration gap from outside the housing, for example. The fact that the channel is formed of ribs, i.e. is open to the outside of the fan wheel cover, means that no additional sliders are required to create channels. The fan wheel cover can thus be manufactured simply with simply designed tools using an injection molding process.

Good air intake can be guaranteed by the use of an admission funnel surrounding the intake opening. Here the opening is advantageously positioned outside the admission funnel. The opening is expediently positioned between the intake opening and the rear face of the housing facing away from the tool attachment. In this arrangement, the opening is positioned in the area of the end of the ribs facing the rear face of the housing. This means that it is possible to take in air through the opening from the carburetor chamber or through the vibration gap. This air is taken in from an area with a comparatively low load of pollutant particles. In order to guarantee an adequate supply of cooling air to the drive motor in the event of emergency cooling, there are several openings which form a slot interrupted by the ribs. In this arrangement, the slot formed by the openings advantageously extends over a large part of the ribs, thereby making the flow cross-section in the area of the opening as large as possible.

The fan wheel cover is expediently designed in one piece. An advantageous design is achieved if the rear face of the wall of the fan wheel cover forming the admission funnel delimits a helically elongated annular chamber into which the fan wheel pushes the air taken in. The helical annular chamber can be designed in one piece with the fan wheel cover in such a manner that no additional components are required. In order to permit the additional intake of air from the area of the front face of the housing if the fan wheel cover is inadvertently covered, ribs extend as far as the front face of the fan wheel cover positioned on the front face of the housing and at least one channel runs to the front face of the fan wheel cover. In an implement with a tubular handle which spans the housing in the vicinity of the front face in particular, it is very unlikely that the channels running to the front face of the fan wheel cover will be covered since they are hard to access. As a result, if the fan wheel cover is partially covered it is also possible to take in air through the channels which run to the front face of the cover.

An embodiment of the invention is explained below with reference to the drawings, in which:

DETAILED DESCRIPTION OF THE PREFERRED EMBODIMENTS

Figure 1:
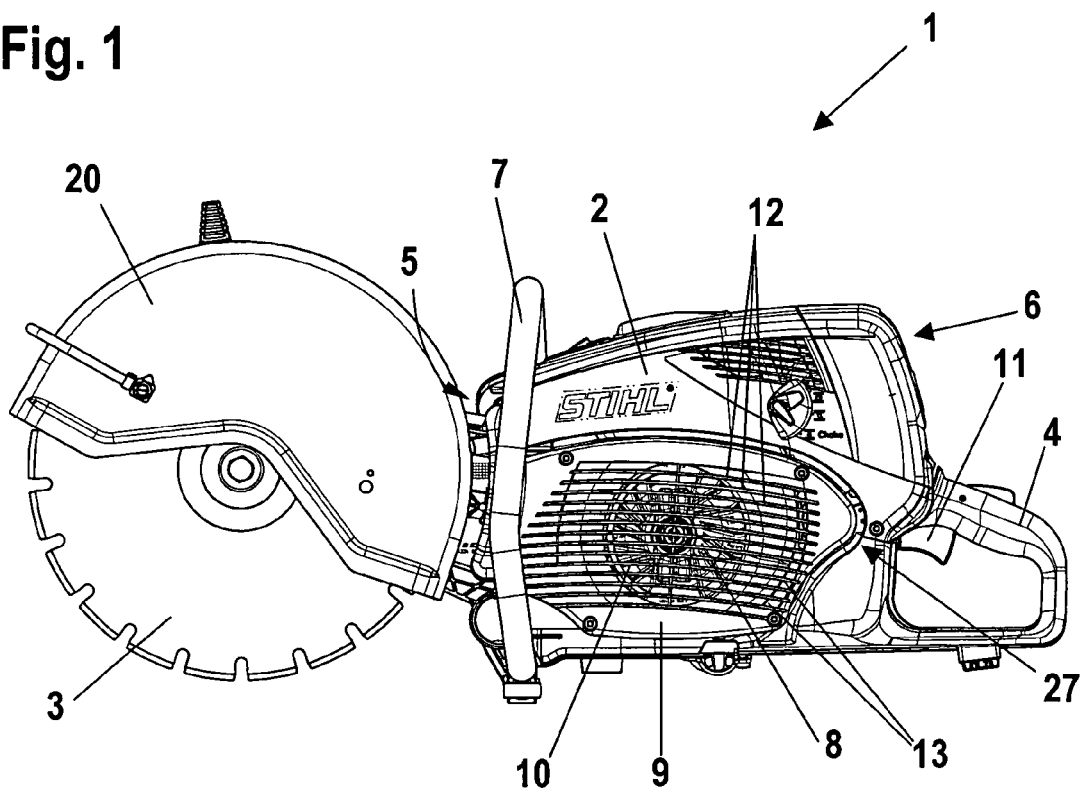
FIG. 1 shows a side view of a cut-off machine.
Figure 2:
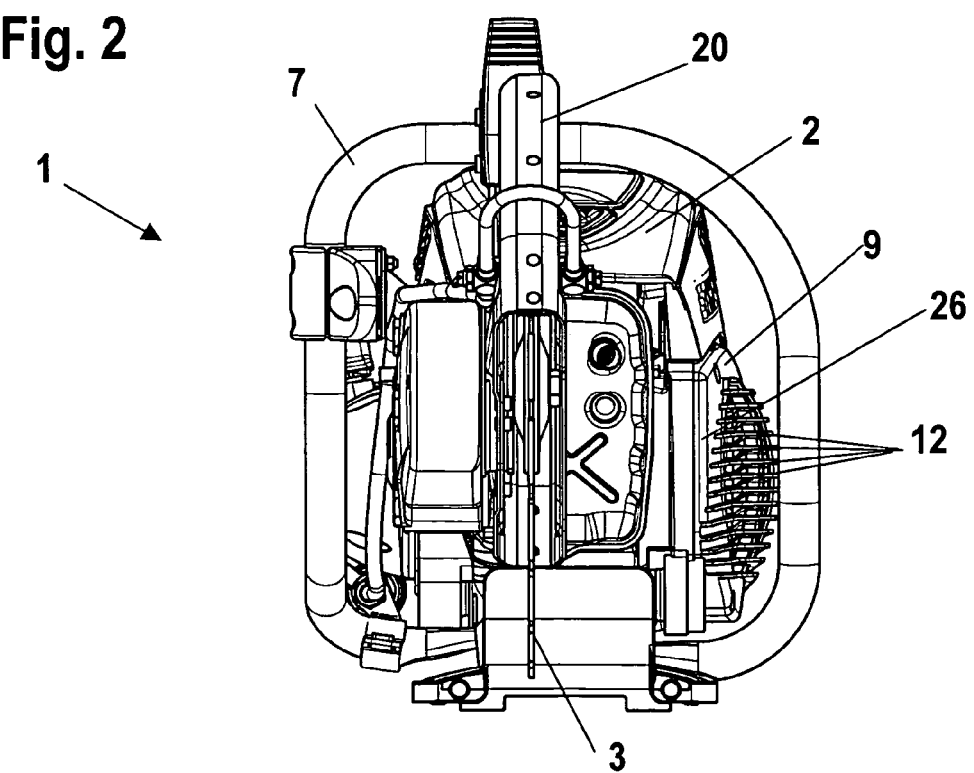
FIG. 2 shows a front view of the cut-off machine illustrated in FIG. 1.

The cut-off machine (1) shown in FIG. 1 has a housing (2) containing a drive motor (not illustrated) providing the rotary drive for a cutting wheel (3). The cutting wheel (3) is partially enclosed by a protective cover (20). The cutting wheel (3) is positioned adjacent to the front face (5) of the housing (2). As is also shown in FIG. 2, the cut-off machine (1) has a gripper bar or tubular handle (7) which spans the housing (2) in the area of the front face (5). Positioned on the rear face (6) of the housing facing away from the front face (5) is a rear handle (4) to which is fixed a trigger switch (11) for operating the drive motor. The cut-off machine (1) has a fan wheel (8) which is driven by the drive motor. The fan wheel (8) is, in particular, fixed to the crankshaft of the drive motor.

The fan wheel (8) is positioned behind a fan wheel cover (9) which separates the fan wheel (8) from the outside of the housing. In the area of the fan wheel (8), the fan wheel cover (9) has an intake opening (10) with a diameter which corresponds approximately to the diameter of the fan wheel (8). The fan wheel (8) takes in air from the surroundings through the intake opening (10). The fan wheel cover (9) has ribs (12) which extend longitudinally along the fan wheel cover (9), i.e. in a direction from the front face (26) of the fan wheel cover (9) to the rear face (27) of the fan wheel cover (9). In this arrangement, the front face (26) (FIG. 2) is the face of the fan wheel cover (9) adjacent to the front face (5) of the housing (2) and the rear face (27) is the face facing the rear face (6) of the housing (2). Beyond the intake opening (10), the fan wheel cover has openings (13) (FIG. 1) which run to the area of the ribs (12) between the intake opening (10) and the rear face (27) of the fan wheel cover (9). The outside and the inside of the fan wheel cover (9) are thus also connected beyond the intake opening (10) by the openings (13).

Figure 3:
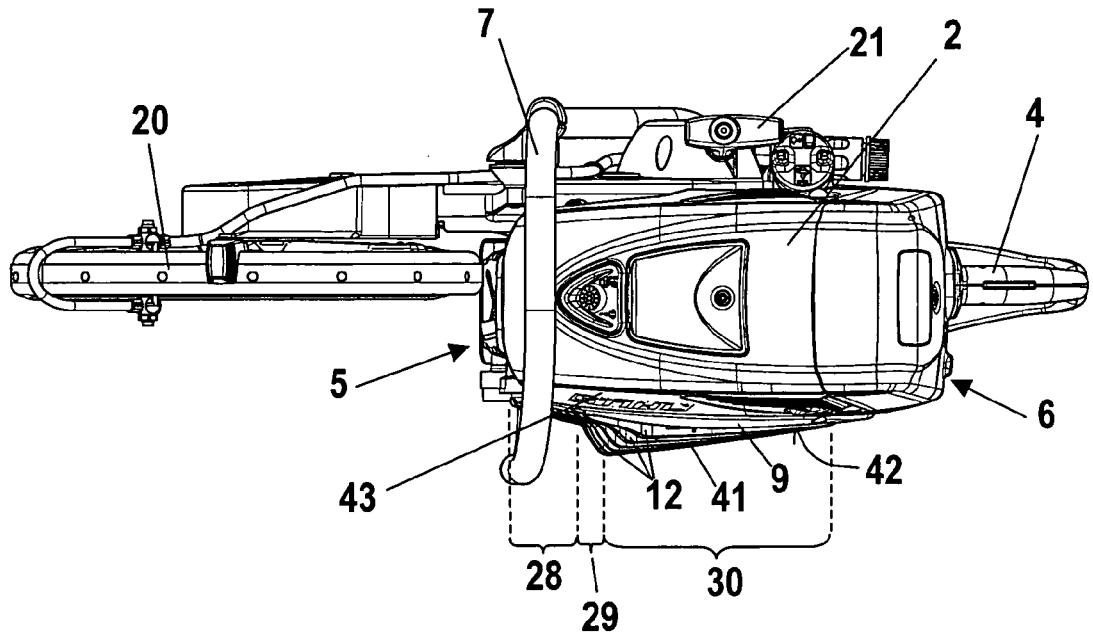
FIG. 3 shows a top view of the cut-off machine illustrated in FIG. 1.
Figure 7:
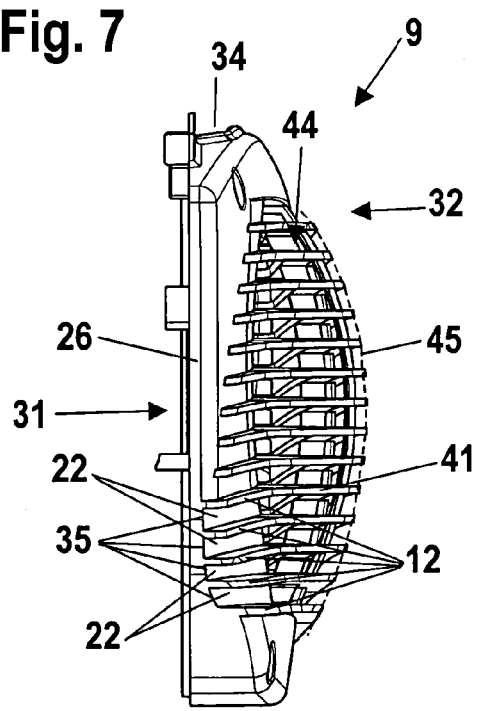
FIG. 7 shows a front view of the fan wheel cover illustrated in FIG. 4.
Figure 8:
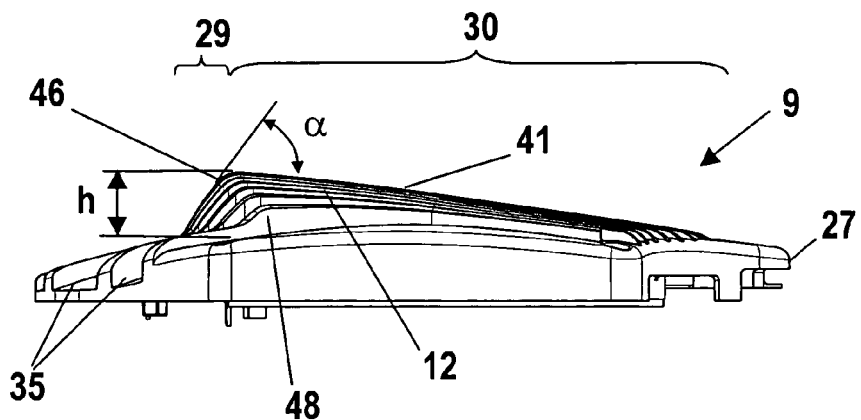
FIG. 8 shows a view of the fan wheel cover in the direction indicated by the arrow (VIII) marked in FIG. 9.
Figure 9:
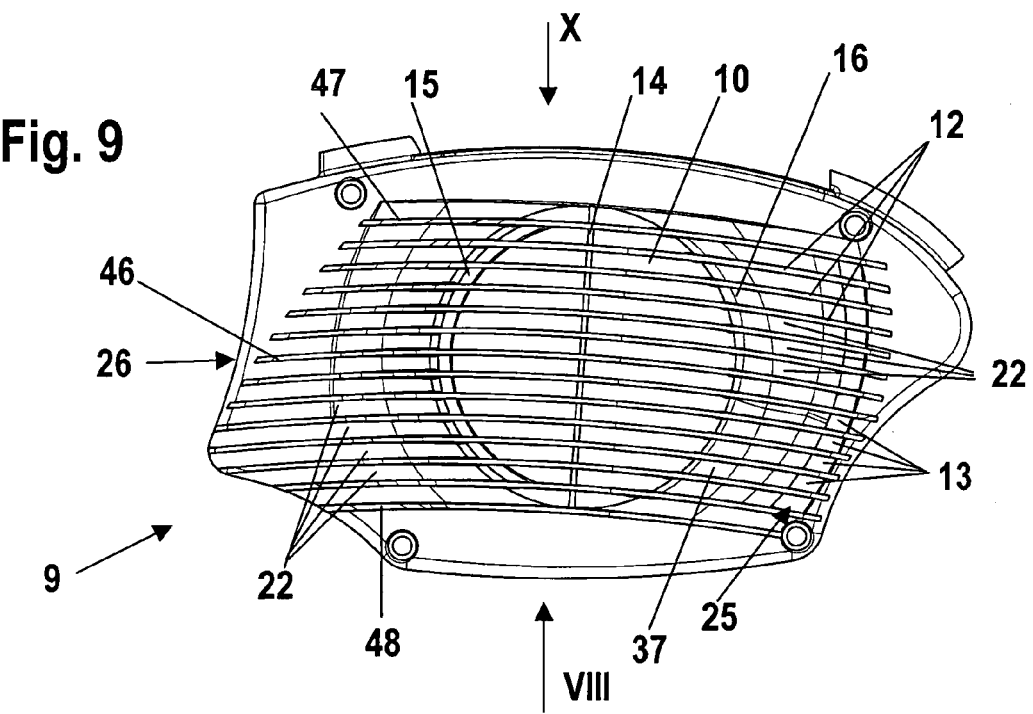
FIG. 9 shows a side view of the outside of the fan wheel cover.

As shown in the top view of the cut-off machine (1) in FIG. 3, a crank handle (21) for operating a manual cranking device on the drive motor is positioned on the face of the housing (2) opposite the fan wheel cover (9). As shown in FIG. 3 and FIGS. 8 and 9, the ribs are not of constant height. Here the height is the distance measured between the outside of the fan wheel cover (9) and the outside of the rib (12). In a first area (28) adjacent to the front face (5) of the housing the ribs (12) run flat. The handle (7) is positioned in this area. The low height of the ribs (12) ensures good access to the handle (7). In an adjacent second area (29) the height of the ribs (12) increases sharply to a maximum height (h). In a third area (30) adjacent to the second area (29) the height of the ribs (12) decreases again constantly. The outward facing upper faces (41) of the ribs (12) form an intake face (42). In the first area (28) the intake face (42) runs towards the surface (43) of the fan wheel cover (9) at only a slight angle. In the second area (29) adjacent to the first area (28) the upper faces (41) of the ribs run towards the surface (43) of the fan wheel cover (9) at a steep angle, thereby forming a section (44) which is positioned transverse to the surface (32) (FIG. 7). In this arrangement, the second area (29) is positioned such that the distance to the handle (7) is sufficient to allow the handle (7) to be gripped. In the third area (30) the upper faces (41) of the ribs (12) run towards the surface (43) of the fan wheel cover (9) at only a slight angle. The intake surface (42) in the second area (29) faces the handle (7) and the front face (5) of the housing (2).

Figure 4:
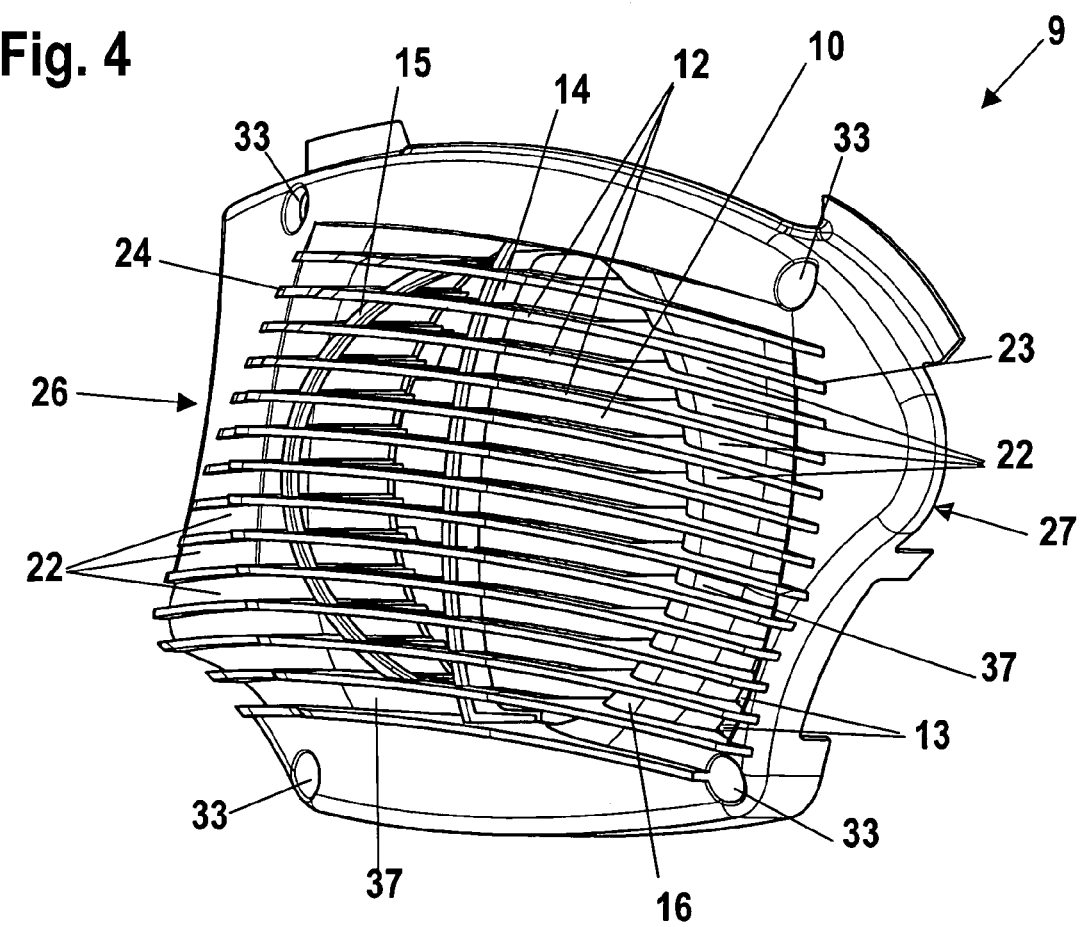
FIG. 4 shows a perspective view of the fan wheel cover of the cut-off machine.

As shown in FIG. 4, the fan wheel cover (9) has four fixing openings (33) at which the fan wheel cover (9) is screwed to the housing (2). However, the fan wheel cover (9) may also be fixed to the housing (2) in another manner. As shown in FIG. 4, the ribs (12) span the intake opening (10) and are connected together approximately centrally over the intake opening (10) by a reinforcing strut (14) which runs at right angles to the ribs (12). A second reinforcing strut (15) is positioned in the area of the maximum height (h) of the individual ribs and connects them together. The reinforcing strut (15) is curved in shape. As shown in the side view of the inside of the fan wheel cover (9) given in FIG. 5, the reinforcing strut (15) runs approximately along the edge of the intake opening (10). Beyond the intake opening (10) runs a wall (37) (FIG. 4) which forms an admission funnel (16) into the intake opening (10). In the area of the admission funnel (16), the ribs (12) together with the wall (37) form channels (22) which run towards the outside of the fan wheel cover (9). The ribs extend from one end (23) which faces the rear face (27) of the fan wheel cover (9) via the admission funnel (16) and the intake opening (10) to the other end (24) which faces the front face (26) of the fan wheel cover (9).

Figure 5:
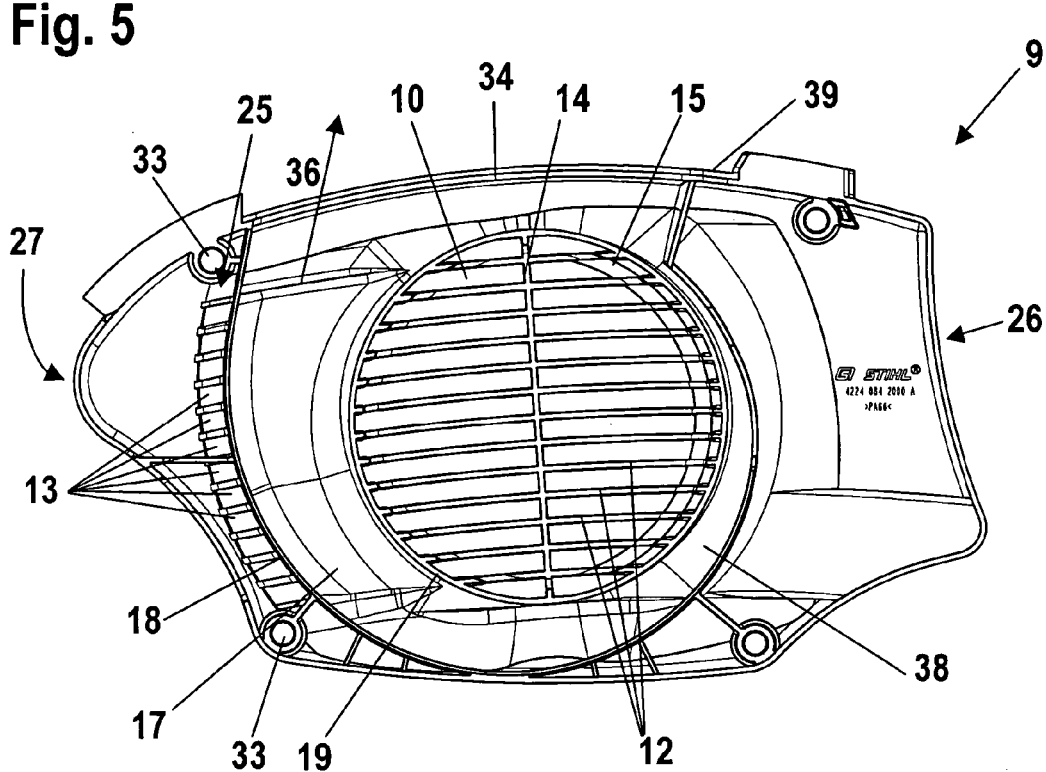
FIG. 5 shows a side view of the inside of the fan wheel cover illustrated in FIG. 4.

Positioned in the area of the end (23) of the ribs (12) are openings (13) in the fan wheel cover (9). As shown in FIG. 5, the rear face (38) of the wall (37) forms a helically elongated annular chamber (17) which is delimited on the inside by the peripheral wall (19) of the intake opening (10) and on the inside by a peripheral wall (18). When the cut-off machine (1) is in operation, air is supplied to the annular chamber (17) by the fan wheel (8). The air leaves the annular chamber (17) in the direction of flow (36) through the outlet opening (34) formed on the upper face (39) of the fan wheel cover (9). The openings (13) are positioned immediately adjacent to the peripheral wall (18) outside the annular chamber (17). In this arrangement, the openings (13) form a slot (25) which is interrupted by the ribs (12) and which extends between two fixing openings (33) across approximately the entire width of the fan wheel cover (9). Thus the slot (25) extends across a large part of the ribs (12). Only in the area of the ribs (12) which end at a fixing opening (33) (FIG. 4) is no opening (13) formed.

Figure 6:
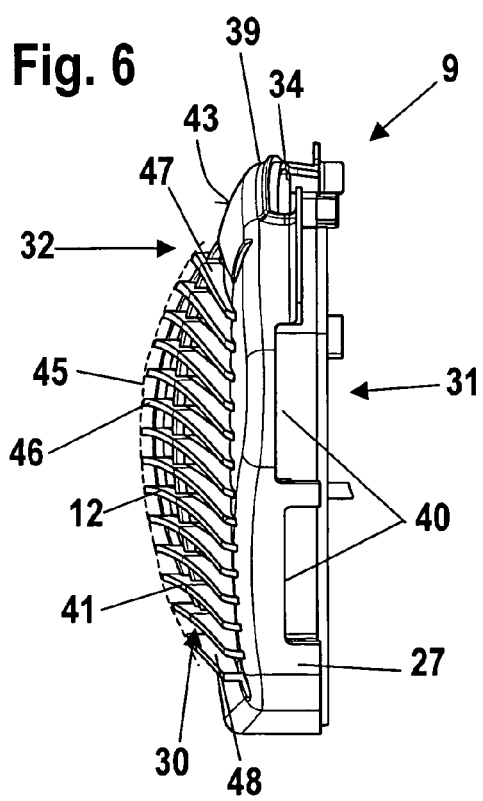
FIG. 6 shows a rear view of the fan wheel cover illustrated in FIG. 5.

As shown in FIG. 6, on its rear face (27) the fan wheel cover (9) has recesses (40) which are positioned in the area of the vibration gap of the cut-off machine (1) and through which air can be taken into the openings (13). In this arrangement, the recesses (40) project into the inside (31) of the fan wheel cover (9). The upper faces (41) of the ribs form an edge (45) at the transition from the third area (30) to the second area (29) (not shown in FIG. 6). In this arrangement, the edge (45) is curved in shape. A central rib (46) lies the greatest distance from the surface formed by the surface (43) of the fan wheel cover (9) at the edge (45). The distance between the upper face (41) of the ribs (12) at the edge (45) decreases steadily towards an upper rib (47) and a lower rib (48). In this arrangement, the upper rib (47) is the rib (12) adjacent to the upper face (39) of the fan wheel cover (9) and the lower rib (48) is the opposing rib (12).

FIG. 7 shows a view of the front face (26) of the fan wheel cover (9). In the second area, the upper faces (41) of the ribs (12) form a section (44) which is delimited by the edge (45) and the edge formed between the first area (28) and the second area (29). The section (44) faces the front face (26) of the fan wheel cover (9). If the third area (30) is inadvertently covered, it is possible to take in air via the section (44). The air taken in this manner is fed through the channels (22) to the intake opening (10).

As shown in FIGS. 7 and 8, some ribs (12) are extended as far as the front face (26) of the fan wheel cover (9). Recesses (35) in the outer side (32) of the fan wheel cover (9) are positioned in the area of the channels (22) formed in the area between these ribs (12). Since the recesses (35) run to the front face (5) of the housing (2), air can be taken in from the front face (5) of the housing (2) through the channels (22) to the intake opening (10) through the recesses (35) even if the ribs (12) are covered on the outer side (32).

Figure 10:
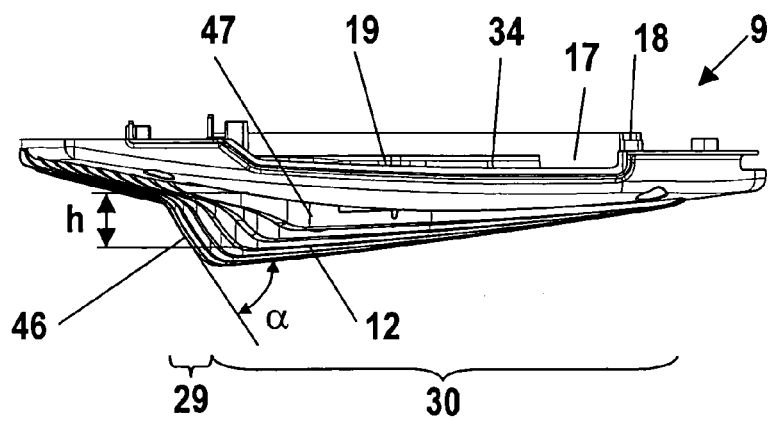
FIG. 10 shows a view of the fan wheel cover in the direction indicated by the arrow (X) marked in FIG. 9.

As shown in FIGS. 8 and 10, the upper face (41) of the ribs (12) in the second area (29) forms an angle (α) with the upper face (41) in the third area (30). The angle (α) is preferably 15° to 90°, in particular 25° to 75°. As shown in FIG. 8, the angle (α) decreases steadily from the central rib (46) to the lower rib (48). As illustrated in FIG. 10, the angle (α) also decreases steadily from the central rib (46) to the upper rib (47).

FIG. 8 shows the maximum height (h) of a rib (12) between the second area (29) and the third area (30). As also shown in FIG. 10, the maximum height (h) of each rib (12) is different and decreases from the central rib (46) towards the upper and lower ribs (47, 48). In addition, the position of the second area moves towards the rear face (27) of the fan wheel cover (9) from the central rib (46) to the upper and lower ribs (47, 48), thereby creating the curved shape of the section (44).

The specification incorporates by reference the disclosure of German priority document DE 10 2004 031 042.4 filed Jun. 25, 2004.

The present invention is, of course, in no way restricted to the specific disclosure of the specification and drawings, but also encompasses any modifications within the scope of the appended claims.

The invention claimed is:

1. A manually operated implement, comprising:
a housing for accommodating a drive motor for driving a tool;
a fan wheel disposed in said housing and adapted to be driven by the drive motor;
a fan wheel cover for covering said fan wheel toward an outer side of said housing, wherein in a vicinity of said fan wheel, said fan wheel cover is provided with an intake opening; and
ribs disposed on an outer surface of said fan wheel cover, wherein said ribs span said intake opening, wherein beyond said intake opening said ribs form channels, wherein said channels run in a plane of the fan wheel cover, wherein said ribs have upper faces that face away from said outer surface of said fan wheel cover, and wherein said upper faces of said ribs form an intake face that in a second area of said ribs is disposed transverse to said outer surface of said fan wheel cover.

2. An implement according to claim 1, wherein in said second area of said ribs, said intake face faces a front face of said housing.

3. An implement according to claim 1, wherein a third area of said ribs adjoins said second area, and wherein an edge is formed between said second and third areas of said ribs.

4. An implement according to claim 1, wherein an upper face of one of said ribs in said second area forms an angle with the upper face of said rib in said third area, and wherein said angle is between 15 and 90°.

5. An implement according to claim 4, wherein said angle is between 25 and 75°.

6. An implement according to claim 4, wherein said angle decreases from a central one of said ribs to an outer one of said ribs.

7. An implement according to claim 1, wherein a height of said ribs in a third area that adjoins said second area decreases continuously in said third area.

8. An implement according to claim 1, wherein said upper faces of said ribs run flat in a first area that adjoins a front face of said housing, and wherein said second area adjoins said first area.

9. An implement according to claim 1, wherein said ribs extend to a front face of said fan wheel cover, wherein said front face is disposed at a front face of said housing, and wherein at least one of said channels of said ribs opens out at said front face of said fan wheel cover.

10. An implement according to claim 1, wherein an opening disposed in said fan wheel cover opens out into at least one of said channels, and wherein said opening communicates via said channel with said intake opening.

11. An implement according to claim 10, wherein said intake opening is surrounded by an admission funnel, and wherein said opening in said fan wheel cover is disposed beyond said admission funnel.

12. An implement according to claim 10, wherein said opening in said fan wheel cover is disposed between said intake opening and a rear face of said housing that faces away from the tool.

13. An implement according to claim 12, wherein said opening in said fan wheel cover is disposed in a vicinity of ends of said ribs that face said rear face of said housing.

14. An implement according to claim 10, wherein a plurality of openings are provided in said fan wheel cover, and wherein said openings form a slot that is interrupted by said ribs.

15. An implement according to claim 14, wherein said slot extends over a large part of said ribs.

16. An implement according to claim 11, wherein a rear face of a wall of said fan wheel cover that forms said admission funnel delimits a helically widening annular chamber, and wherein said fan wheel conveys drawn-in air into said annular chamber.

17. An implement according to claim 1, wherein said fan wheel cover is monolithically formed.

18. An implement according to claim 1, wherein said ribs extend to a front face of said fan wheel cover, and wherein at least one of said channels of said ribs opens out at said front face of said fan wheel cover.

19. An implement according to claim 1, wherein said ribs extend from a first end facing a rear face of the fan wheel cover via an admission funnel and the intake opening to a second end facing a front face of the fan wheel cover.

20. A manually operated implement, comprising:
a housing for accommodating a drive motor for driving a tool;
a fan wheel disposed in said housing and adapted to be driven by the drive motor;
a fan wheel cover for covering said fan wheel toward an outer side of said housing, wherein in a vicinity of said fan wheel, said fan wheel cover is provided with an intake opening; and
ribs disposed on an outer surface of said fan wheel cover, wherein said ribs span said intake opening, wherein beyond said intake opening said ribs form channels, wherein said channels run in a common plane with the fan wheel cover, wherein said ribs have upper faces that face away from said outer surface of said fan wheel cover, wherein in a second area of said ribs, the upper faces of the ribs run towards the outer surface of the fan wheel cover at an angle, so that said upper faces of said ribs form an intake face that in the second area of said ribs is disposed transverse to said outer surface of said fan wheel cover.

21. A manually operated implement, comprising:
a housing for accommodating a drive motor for driving a tool;
a fan wheel disposed in said housing and adapted to be driven by the drive motor;
a fan wheel cover for covering said fan wheel toward an outer side of said housing, wherein in a vicinity of said fan wheel, said fan wheel cover is provided with an intake opening; and
ribs disposed on an outer surface of said fan wheel cover, wherein said ribs span said intake opening, wherein beyond said intake opening said ribs form channels, wherein said ribs have upper faces that face away from said outer surface of said fan wheel cover, and wherein said upper faces of said ribs form an intake face that in a second area of said ribs is disposed transverse to said outer surface of said fan wheel cover,
wherein an opening disposed in said fan wheel cover opens out into at least one of said channels, and wherein said opening communicates via said channel with said intake opening, and wherein the opening connects the outer surface and an inner surface of the fan wheel cover beyond the intake opening.

* * * * *